US009582714B2

(12) United States Patent
Ross et al.

(10) Patent No.: US 9,582,714 B2
(45) Date of Patent: Feb. 28, 2017

(54) DIGITAL FINGERPRINTING TRACK AND TRACE SYSTEM (71) Applicant: AUTHENTECT, INC., Redmond, WA (US)

(72) Inventors: David Ross, Redmond, WA (US); Brian Elmenhurst, Redmond, WA (US); Mark Tocci, Redmond, WA (US); John Forbes, Redmond, WA (US); Heather Wheelock Ross, Redmond, WA (US)

(73) Assignee: Alitheon, Inc., Redmond, WA (US)

( * ) Notice: Subject to any disclaimer, the term of this patent is extended or adjusted under 35 U.S.C. 154(b) by 0 days.

(21) Appl. No.: 14/531,307

(22) Filed: Nov. 3, 2014

(65) Prior Publication Data
US 2015/0067346 A1 Mar. 5, 2015

Related U.S. Application Data (63) Continuation of application No. 14/290,653, filed on May 29, 2014, which is a continuation of application
(Continued)

(51) Int. Cl.
G06K 9/00 (2006.01)
B07C 5/342 (2006.01)
(Continued)

(52) U.S. Cl.
CPC ........ *G06K 9/00483* (2013.01); *B07C 5/3422* (2013.01); *G06F 17/30247* (2013.01);
(Continued)

(58) Field of Classification Search
None
See application file for complete search history.

(56) References Cited

U.S. PATENT DOCUMENTS 4,218,674 A 8/1980 Brosow
4,423,415 A 12/1983 Goldman
(Continued)

FOREIGN PATENT DOCUMENTS

DE 102006 005927 8/2007
EP 759596 2/1997
(Continued)

OTHER PUBLICATIONS

Clifton Smith; "Fireball: A Forensic Ballistic Imaging System"; Security Science, Edith Cowan University; IEEE; 1997.
(Continued)

*Primary Examiner* — Oneal R Mistry
(74) *Attorney, Agent, or Firm* — Schwabe Williamson & Wyatt, PC (57) ABSTRACT Methods and systems for tracking a physical object to identify or authenticate it utilizing digital fingerprints which are based on natural features extracted from a digital image of the object. Digital fingerprints do not require or rely on any labels, tags, integrated materials, unique identification characters, codes or other items that may be added to the object specifically for the purpose of identification. Consequently, the disclosed digital fingerprint techniques help to detect or prevent unauthorized alterations of documents, apparel, drugs and pharmaceuticals, etc. Further digital fingerprints can be used to better track and trace a wide variety of objects throughout the distribution chain to demonstrate their provenance and to detect counterfeit objects.

16 Claims, 7 Drawing Sheets

Related U.S. Application Data

No. 13/410,753, filed on Mar. 2, 2012, now Pat. No. 8,774,455, application No. 14/531,307, which is a continuation of application No. 13/618,362, filed on Sep. 14, 2012, now Pat. No. 9,152,862.

(60) Provisional application No. 61/898,780, filed on Nov. 1, 2013, provisional application No. 61/914,722, filed on Dec. 11, 2013, provisional application No. 61/448,465, filed on Mar. 2, 2011, provisional application No. 61/535,084, filed on Sep. 15, 2011.

(51) Int. Cl.
| | |
|---|---|
| *G06K 9/32* | (2006.01) |
| *G06F 17/30* | (2006.01) |
| *H04L 9/32* | (2006.01) |
| *G06K 9/46* | (2006.01) |
| *G06K 9/52* | (2006.01) |
| *G06T 7/40* | (2006.01) |
| *G06T 7/60* | (2006.01) |
| *G06Q 50/32* | (2012.01) |

(52) U.S. Cl.
CPC .. *G06F 17/30253* (2013.01); *G06F 17/30542* (2013.01); *G06K 9/3216* (2013.01); *G06K 9/4652* (2013.01); *G06K 9/52* (2013.01); *G06T 7/408* (2013.01); *G06T 7/60* (2013.01); *H04L 9/3247* (2013.01); *G06K 2209/01* (2013.01); *G06Q 50/32* (2013.01)

(56) References Cited

U.S. PATENT DOCUMENTS

| | | | |
|---|---|---|---|
| 4,677,435 A | 6/1987 | Causse D'Agraives | |
| 4,921,107 A | 5/1990 | Hofer | |
| 5,031,223 A | 7/1991 | Rosenbaum | |
| 5,079,714 A | 1/1992 | Manduley | |
| 5,393,939 A | 2/1995 | Nasuta, Jr. | |
| 5,422,821 A | 6/1995 | Allen | |
| 5,514,863 A | 5/1996 | Williams | |
| 5,518,122 A | 5/1996 | Tilles | |
| 5,703,783 A | 12/1997 | Allen et al. | |
| 5,719,939 A | 2/1998 | Tel | |
| 5,734,568 A | 3/1998 | Borgendale | |
| 5,745,590 A | 4/1998 | Pollard | |
| 5,883,971 A | 3/1999 | Bolle | |
| 5,923,848 A | 7/1999 | Goodhand | |
| 5,974,150 A | 10/1999 | Kaish | |
| 6,246,794 B1 | 6/2001 | Kagehiro | |
| 6,292,709 B1 | 9/2001 | Uhl | |
| 6,327,373 B1 | 12/2001 | Yura | |
| 6,343,327 B2 | 1/2002 | Daniels, Jr. | |
| 6,360,001 B1 | 3/2002 | Berger | |
| 6,370,259 B1 | 4/2002 | Hobson | |
| 6,434,601 B1 | 8/2002 | Rollins | |
| 6,470,091 B2 | 10/2002 | Koga | |
| 6,539,098 B1 | 3/2003 | Baker | |
| 6,549,892 B1 | 4/2003 | Sansone | |
| 6,697,500 B2 | 2/2004 | Woolston | |
| 6,741,724 B1 | 5/2004 | Bruce | |
| 6,768,810 B2 | 7/2004 | Emanuelsson | |
| 6,778,703 B1 | 8/2004 | Zlotnick | |
| 6,805,926 B2 | 10/2004 | Cote et al. | |
| 6,816,602 B2 | 11/2004 | Coffelt | |
| 6,829,369 B2 | 12/2004 | Poulin | |
| 6,985,926 B1 | 1/2006 | Ferlauto | |
| 7,016,532 B2 | 3/2006 | Boncyk | |
| 7,096,152 B1 | 8/2006 | Ong | |
| 7,121,458 B2 | 10/2006 | Avant | |
| 7,171,049 B2 | 1/2007 | Snapp | |
| 7,204,415 B2 | 4/2007 | Payne | |
| 7,212,949 B2 | 5/2007 | Bachrach | |
| 7,356,162 B2 | 4/2008 | Caillon | |
| 7,436,979 B2 | 10/2008 | Bruce | |
| 7,477,780 B2 | 1/2009 | Boncyk | |
| 7,518,080 B2 | 4/2009 | Amato | |
| 7,602,938 B2 | 10/2009 | Prokoski | |
| 7,674,995 B2 | 3/2010 | Desprez | |
| 7,680,306 B2 | 3/2010 | Boutant | |
| 7,720,256 B2 | 5/2010 | Desprez | |
| 7,726,548 B2 | 6/2010 | deLaVergne | |
| 7,822,263 B1 | 10/2010 | Prokoski | |
| 7,834,289 B2 | 11/2010 | Orbke | |
| 7,853,792 B2 | 12/2010 | Cowburn | |
| 8,022,832 B2 | 9/2011 | Vogt | |
| 8,108,309 B2 | 1/2012 | Tan | |
| 8,180,174 B2 | 5/2012 | Di Venuto | |
| 8,180,667 B1 | 5/2012 | Baluja | |
| 8,194,938 B2 | 6/2012 | Wechsler | |
| 8,428,772 B2 | 4/2013 | Miette | |
| 8,477,992 B2 | 7/2013 | Paul | |
| 8,520,888 B2 | 8/2013 | Spitzig | |
| 8,526,743 B1 | 9/2013 | Campbell | |
| 8,774,455 B2 | 7/2014 | Elmenhurst | |
| 9,058,543 B2 | 6/2015 | Campbell | |
| 9,152,862 B2 | 10/2015 | Ross | |
| 2001/0010334 A1 | 8/2001 | Park | |
| 2001/0054031 A1 | 12/2001 | Lee | |
| 2002/0015515 A1 | 2/2002 | Lichtermann | |
| 2002/0168090 A1 | 11/2002 | Bruce | |
| 2003/0046103 A1 | 3/2003 | Amato | |
| 2003/0091724 A1* | 5/2003 | Mizoguchi | G06K 9/00087 427/1 |
| 2003/0120677 A1 | 6/2003 | Vernon | |
| 2003/0179931 A1 | 9/2003 | Sun | |
| 2003/0182018 A1 | 9/2003 | Snapp | |
| 2003/0208298 A1 | 11/2003 | Edmonds | |
| 2004/0027630 A1 | 2/2004 | Lizotte | |
| 2004/0112962 A1 | 6/2004 | Farrall | |
| 2004/0218791 A1 | 11/2004 | Jiang | |
| 2005/0065719 A1 | 3/2005 | Khan | |
| 2005/0086256 A1 | 4/2005 | Owens | |
| 2005/0119786 A1 | 6/2005 | Kadaba | |
| 2005/0131576 A1 | 6/2005 | DeLeo | |
| 2005/0188213 A1 | 8/2005 | Xu | |
| 2005/0251285 A1 | 11/2005 | Boyce | |
| 2005/0257064 A1 | 11/2005 | Boutant et al. | |
| 2006/0010503 A1 | 1/2006 | Inoue et al. | |
| 2006/0083414 A1 | 4/2006 | Neumann | |
| 2006/0131518 A1 | 6/2006 | Ross | |
| 2006/0177104 A1 | 8/2006 | Prokoski | |
| 2006/0253406 A1* | 11/2006 | Caillon | B07C 3/00 705/410 |
| 2007/0094155 A1 | 4/2007 | Dearing | |
| 2007/0263267 A1 | 11/2007 | Ditt | |
| 2007/0282900 A1 | 12/2007 | Owens | |
| 2008/0011841 A1 | 1/2008 | Self | |
| 2008/0130947 A1 | 6/2008 | Ross | |
| 2008/0219503 A1 | 9/2008 | DiVenuto | |
| 2008/0250483 A1 | 10/2008 | Lee | |
| 2008/0255758 A1 | 10/2008 | Graham | |
| 2008/0272585 A1 | 11/2008 | Conard | |
| 2008/0294474 A1 | 11/2008 | Furka | |
| 2009/0028379 A1 | 1/2009 | Belanger | |
| 2009/0057207 A1 | 3/2009 | Orbke | |
| 2009/0106042 A1 | 4/2009 | Maytal | |
| 2009/0154778 A1* | 6/2009 | Lei | G06K 9/00456 382/112 |
| 2009/0157733 A1 | 6/2009 | Kim | |
| 2009/0271029 A1 | 10/2009 | Doutre | |
| 2009/0307005 A1 | 12/2009 | O'Martin | |
| 2010/0027834 A1 | 2/2010 | Spitzig | |
| 2010/0070527 A1 | 3/2010 | Chen | |
| 2010/0104200 A1 | 4/2010 | Baras et al. | |
| 2010/0163612 A1* | 7/2010 | Caillon | B07C 3/18 235/375 |
| 2010/0166303 A1 | 7/2010 | Rahimi | |
| 2010/0174406 A1* | 7/2010 | Miette | B07C 1/00 700/223 |
| 2011/0161117 A1 | 6/2011 | Busque et al. | |
| 2011/0188709 A1* | 8/2011 | Gupta | G06F 21/32 382/115 |

(56) References Cited

U.S. PATENT DOCUMENTS

| | | |
|---|---|---|
| 2011/0194780 A1 | 8/2011 | Lie |
| 2011/0235920 A1 | 9/2011 | Iwamoto |
| 2012/0042171 A1* | 2/2012 | White .................. G06F 21/32 713/186 |
| 2012/0130868 A1 | 5/2012 | Loken |
| 2012/0250945 A1 | 10/2012 | Peng et al. |
| 2013/0284803 A1 | 10/2013 | Wood |
| 2014/0140570 A1 | 5/2014 | Ross |
| 2014/0140571 A1 | 5/2014 | Elmenhurst |
| 2014/0184843 A1 | 7/2014 | Campbell |
| 2014/0270341 A1 | 9/2014 | Elmenhurst |
| 2015/0067346 A1 | 3/2015 | Ross |
| 2015/0078629 A1* | 3/2015 | Gottemukkula ..... G06K 9/0061 382/117 |
| 2015/0117701 A1 | 4/2015 | Ross |
| 2016/0162734 A1 | 6/2016 | Ross |

FOREIGN PATENT DOCUMENTS

| | | | |
|---|---|---|---|
| EP | 1016548 | 7/2000 | |
| EP | 1719070 | 4/2006 | |
| EP | 2195621 | 6/2010 | |
| EP | 2195621 B1 | 6/2010 | |
| EP | 2869240 | 5/2015 | |
| EP | 2869241 | 5/2015 | |
| FR | WO 2009030853 A1 * | 3/2009 | .............. B07C 1/00 |
| GB | 2097979 | 11/1982 | |
| JP | 61-234481 | 10/1986 | |
| WO | 2006/038114 | 4/2006 | |
| WO | 2007/031176 A1 | 3/2007 | |
| WO | 2007/071788 | 6/2007 | |
| WO | 2007/090437 | 8/2007 | |
| WO | 2012/145842 | 11/2012 | |
| WO | 2013/126221 | 8/2013 | |

OTHER PUBLICATIONS

European Patent Office; Extended European Search Report, EP 14191546.2; dated May 8, 2015; 9 pages.

European Patent Office; Extended European Search Report, EP 14191548.8; dated May 21, 2015; 6 pages.

Huang, et al., "An Online Ballistics Imaging System for Firearm Identification"; 2010 2nd International Conference on Signal Processing Systems (ICSPS).

Leng, et al., "A Novel Binarization Algorithms for Ballistics Imaging Systems"; 2010 3rd International Congress on Image and Signal Processing (CISP2010).

Li; "Firearm Identification System Based on Ballistics Image Processing"; 2008 Congress on Image and Signal Processing.

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

United States Postal Service Publication 28 "Postal Addressing Standards", dated Jul. 2008; text plus Appendix A only; 55 pages.

United States Postal Service, "NCOALink Systems", http://www.usps.com/ncsc/addressservices/moveupdate/changeaddress.htm, website accessed Jun. 23, 2010, 2 pages.

Stolowitz Ford Cowger LLP, Portland Oregon; Related Case Listing (NPL); Jul. 21, 2013; 1 pages.

* cited by examiner

FIG. 6 Sample Authentication Regions

DIGITAL FINGERPRINTING TRACK AND TRACE SYSTEM

RELATED APPLICATIONS

This application is a non-provisional of, and claims priority pursuant to 35 USC §119(e) to, U.S. provisional application No. 61/898,780 filed Nov. 1, 2013 and to U.S. provisional application No. 61/914,722 filed Dec. 11, 2013. This application also is a continuation of U.S. application Ser. No. 14/290,653 filed May 29, 2014, which is a continuation of U.S. application Ser. No. 13/410,753 filed Mar. 2, 2012 (now U.S. Pat. No. 8,774,455) which claims benefit of 61/448,465 filed on Mar. 2, 2011. This application also is a continuation of U.S. application Ser. No. 13/618,362 filed on Sep. 14, 2012 which claims benefit of 61/535,084 filed Sep. 15, 2011. All of the aforementioned applications are hereby incorporated by reference as though fully set forth.

Copyright © 2011-2014 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND

Counterfeiting of manufactured goods is a worldwide problem, with recent studies estimating that 8% of the world's total GDP is now generated by the manufacturing and sales of counterfeit products. Many classes of counterfeit goods create substantial risks to public health including counterfeit pharmaceutical drugs, auto parts, pesticides, and children's toys. In addition, counterfeit computer chips, aerospace parts, and identification documents present significant risks to national security.

Authentication alone is not enough to stop counterfeiting. Counterfeiters use a variety of strategies, including diverting unfinished products from factories that make authentic goods and then adding their own counterfeit brand identifiers such as labels and tags. Counterfeit items can enter the supply chain at any point, including at the original manufacturing facility, at the shipper, in distribution, or in retail stores. Unless the manufacturer or supplier can identify exactly where and when the item entered the supply chain, identifying and eliminating the counterfeit goods can be almost impossible.

Many different approaches have been tried to uniquely identify and authenticate objects, including labeling and tagging strategies using serial numbers, bar codes, holographic labels, RFID tags, and hidden patterns using security inks or special fibers. All of these methods can be duplicated, and many add a substantial extra cost to the production of the goods sought to be protected. Physical labels and tags can also be easily lost, modified, or stolen.

SUMMARY OF THE DISCLOSURE

The following is a summary of the present disclosure in order to provide a basic understanding of some features and context. This summary is not intended to identify key/critical elements of the invention or to delineate the scope of the invention. Its sole purpose is to present some concepts of the present disclosure in a simplified form as a prelude to the more detailed description that is presented later.

In an embodiment, individual objects are scanned and a unique digital signature is generated by a digital fingerprinting method that utilizes the object's natural structure or features. The object is registered in the system database. Once the object is registered, the Digital Fingerprinting Track and Trace System can track the location of any object as it passes through a supply chain, distribution network, or sales channel. The system maintains a database record for each unique object, and can store any relevant data related to the object over the course of its lifetime. The system can be queried, generate reports, and analyze data on individual objects or on sets of objects. Applications of the system include but are not limited to object authentication, determining the provenance of an object, creating audit trails, and identifying where counterfeit goods are entering manufacturing, distribution or sales networks.

In other applications, an original digital fingerprint can be compared to a subsequent digital fingerprint of an object to establish that the object is the original, without regard to its history of locations or possession since the original digital fingerprint was acquired and stored.

Another aspect of this disclosure relates to detecting a counterfeit or forged object, for example a document such as a drivers license or passport. In this case, there may be no "original" or source object digital fingerprint for comparison. Rather, "fingerprints" of known indicia of counterfeit or forged objects can be acquired and stored. For example, a large number of bogus New York State driver's licenses might be obtained by law enforcement officials in a raid or the like. Digital images of those forged documents can be acquired, and analyzed to form digital fingerprints, as described in more detail below.

In an embodiment, "Forgery feature vectors" can be collected and stored in a database, for example, sharp, non-bleeding edges where a photograph has been replaced or torn paper fibers where an erasure occurred. These fingerprints can be searched and compared to detect a forged document. A count of "fraud indicator matches" can be compared to an empirical threshold to determine a confidence that a document is forged (or not). Additional aspects and advantages of this invention will be apparent from the following detailed description of preferred embodiments, which proceeds with reference to the accompanying drawings.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

In this application, we use the term "scan" in a broad sense. We refer to any means for capturing an image or set of images, which may be in digital form or transformed into digital form. The images may be two dimensional, three dimensional, or be in the form of a video. Thus a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

Because digital fingerprinting works with many different types of objects, it is necessary to define what parts of the digital images of the objects are to be used for the extraction of features for authentication purposes. This can vary widely for different classes of objects. In some cases it is the image of the entire object; in other cases it will be a specific sub-region of the image of the object. For instance, for a photograph we may want to use the digital image of the entire photograph for feature extraction. Each photograph is different, and there may be unique feature information anywhere in the photograph. So in this case, the authentication region will be the entire photograph.

Multiple regions may be used for fingerprints for several reasons, two of which are particularly important. It may be that there are several regions where significant variations take place among different similar objects that need to be distinguished while, in the same objects, there may be regions of little significance. In that case a template may be used (see below) primarily to eliminate regions of little interest.

A bank note, for example, can be authenticated if a few small arbitrary regions scattered across the surface are fingerprinted, along with recognizing the contents of a region telling the value of the bank note and one containing the bank note's serial number. In such a case the fingerprints of any region (along with sufficient additional information to determine the bank note's value and its purported identity) may be sufficient to establish the authenticity of the bill and multiple fingerprinted regions are used solely in the event that one or more regions may be absent (through, for example, tearing) when the bill is later presented for authentication. Sometimes, however, all regions of an item must be authenticated to ensure the item is both authentic and has not been altered.

Figure 6:
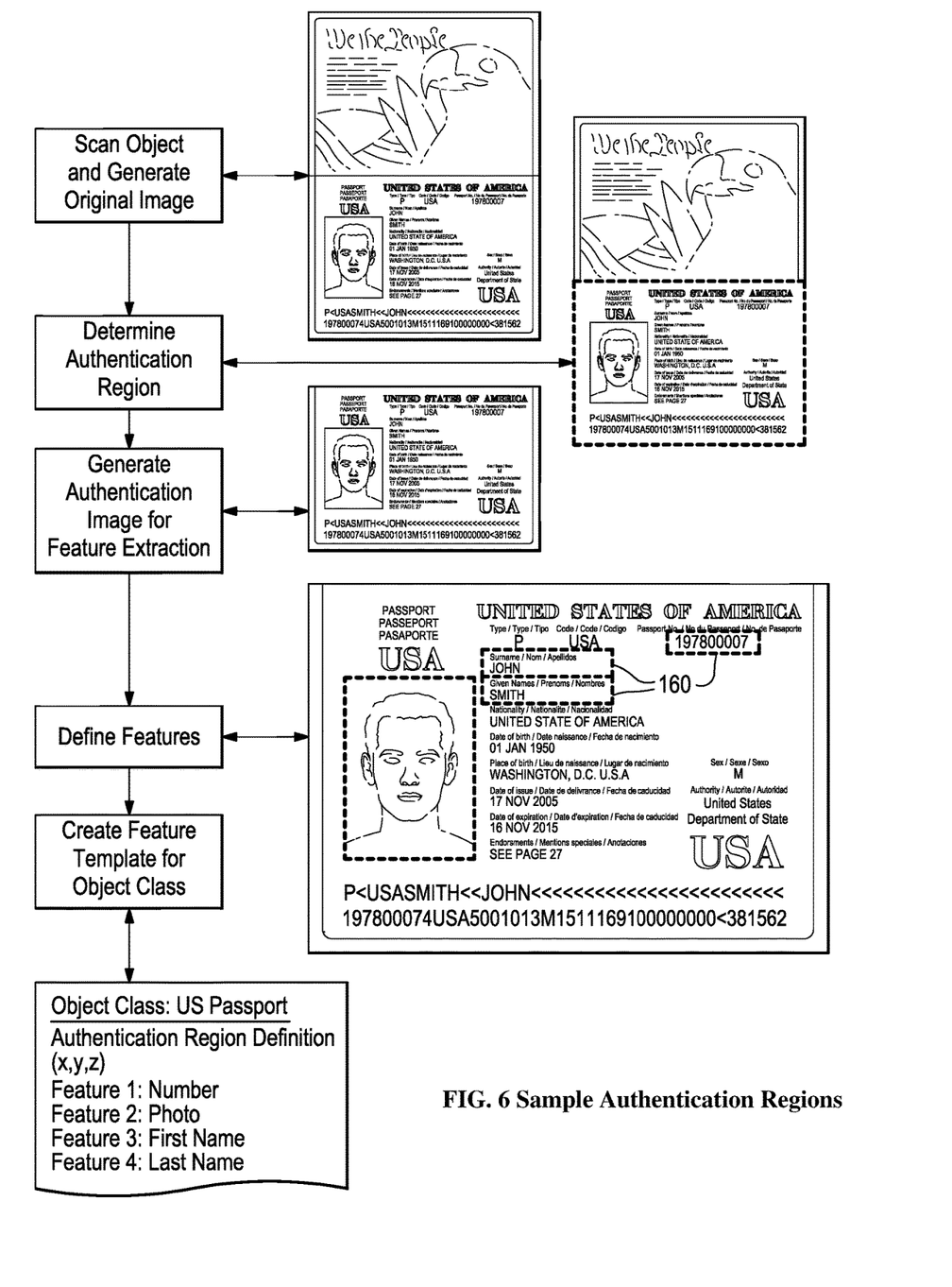
FIG. 6 illustrates an example of authentication region and object feature definition for a U.S. passport.

A passport provides an example of feature extraction from an authentication region; see FIG. 6. On a passport, the features that we may want to use for authentication may be extracted from regions containing such specific identification information as the passport number, recipient name, and recipient photo, as illustrated in FIG. 6. In that case one may define a feature template specifying those regions whose alteration from the original would invalidate the passport, such regions including the passport holder's photo and unique personal data.

The ability to define and store the optimal authentication region for a given class of objects offers significant benefits to the user, although it is not mandatory. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning the optimal authentication region. For instance, an appropriately sized location box and crosshairs can automatically appear in the viewfinder of a smartphone camera application to help the user center the camera on the authentication region, and automatically lock onto the region and take the picture when the camera is focused on the correct area. It should be noted that while some examples discussed above are essentially two-dimensional objects (passport, bank note), the present disclosure is fully applicable to three-dimensional objects as well. Scanning or image capture may be 2-D, 3-D, stereoscopic, HD etc. Image capture is not limited to the use of visible light.

In many cases, objects may have permanent labels or other identifying information attached to them. These can also be used as features for digital fingerprinting. For instance, wine may be put into a glass bottle and a label affixed to the bottle. Since it is possible for a label to be removed and reused, simply using the label itself as the authentication region is often not sufficient. In this case we may define the authentication region to include both the label and the substrate it is attached to—in this case some portion of the glass bottle. This "label and substrate" approach may be useful in defining authentication regions for many types of objects, such as consumer goods and pharmaceutical packaging. If a label has been moved from it's original position, this can be an indication of tampering or counterfeiting. If the object has "tamper-proof" packaging, this may also be useful to include in the authentication region.

In some cases, we will want to use multiple authentication regions to extract unique features. For a firearm, for example, we might extract features from two different parts of the weapon. It is, of course, important that both match the original but since the two parts may both have been taken from the original weapon and affixed to a weapon of substandard quality, it may also be important to determine whether their relative positions have changed as well. In other words it may be necessary to determine that the distance (or other characteristic) between Part A's authentication region and Part B's authentication region is effectively unchanged, and only if that is accomplished can the weapon be authenticated. Specifications of this type can be stored with or as part of a digital fingerprint of the firearm.

Once a suitable digital fingerprint of an object is acquired, the object (actually some description of it) and corresponding fingerprint may be stored or "registered" in a database. For example, in some embodiments, the fingerprint may comprise one or more feature vectors. The database should be secure. In some embodiments, a unique ID also may be assigned to an object. An ID may be a convenient index in some applications. However, it is not essential, as a digital fingerprint itself can serve as a key for searching a database. In other words, by identifying an object by the unique features and characteristics of the object itself, arbitrary identifiers, labels, tags, etc. are unnecessary and, as noted, inherently unreliable.

Figure 1A:
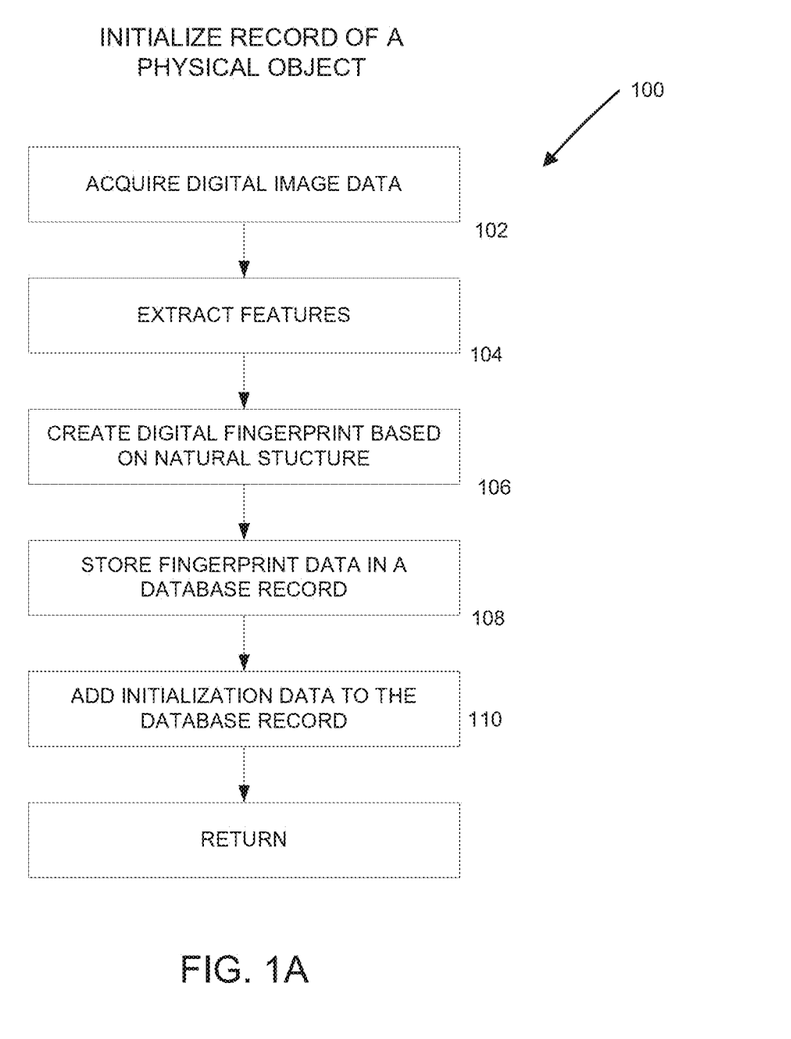
FIG. 1A is a simplified flow diagram illustrating a method for creating a storing a digital fingerprint of an object in a database.

FIG. 1 is a simplified flow diagram illustrating a method 100 for creating and storing or "registering" a digital fingerprint of an object in a database. The process in one embodiment includes acquiring a digital image of the object, block 102, as discussed above. A variety of image capture technologies and devices may be used as noted. Next, features are extracted, block 104, from the digital image data. As explained, specific features or regions of interest (authentication regions) may be selected in support of subsequent identification or authentication of the object. The extracted features are analyzed and feature vectors are extracted to form a digital fingerprint—a digital file or record associated with the original image data, indicated at block 106. The digital fingerprint preferably may be stored in a database record. Other forms of searchable digital data storage should be deemed equivalents. Further, at block 110, initialization data should be added to the database record, or associated with it in a related table. This data is associated with the physical object that was scanned. For example, a description, manufacturer, model number, serial number, contents—a wide variety of data, selected as appropriate or useful depending on the type of object.

Figure 1B:
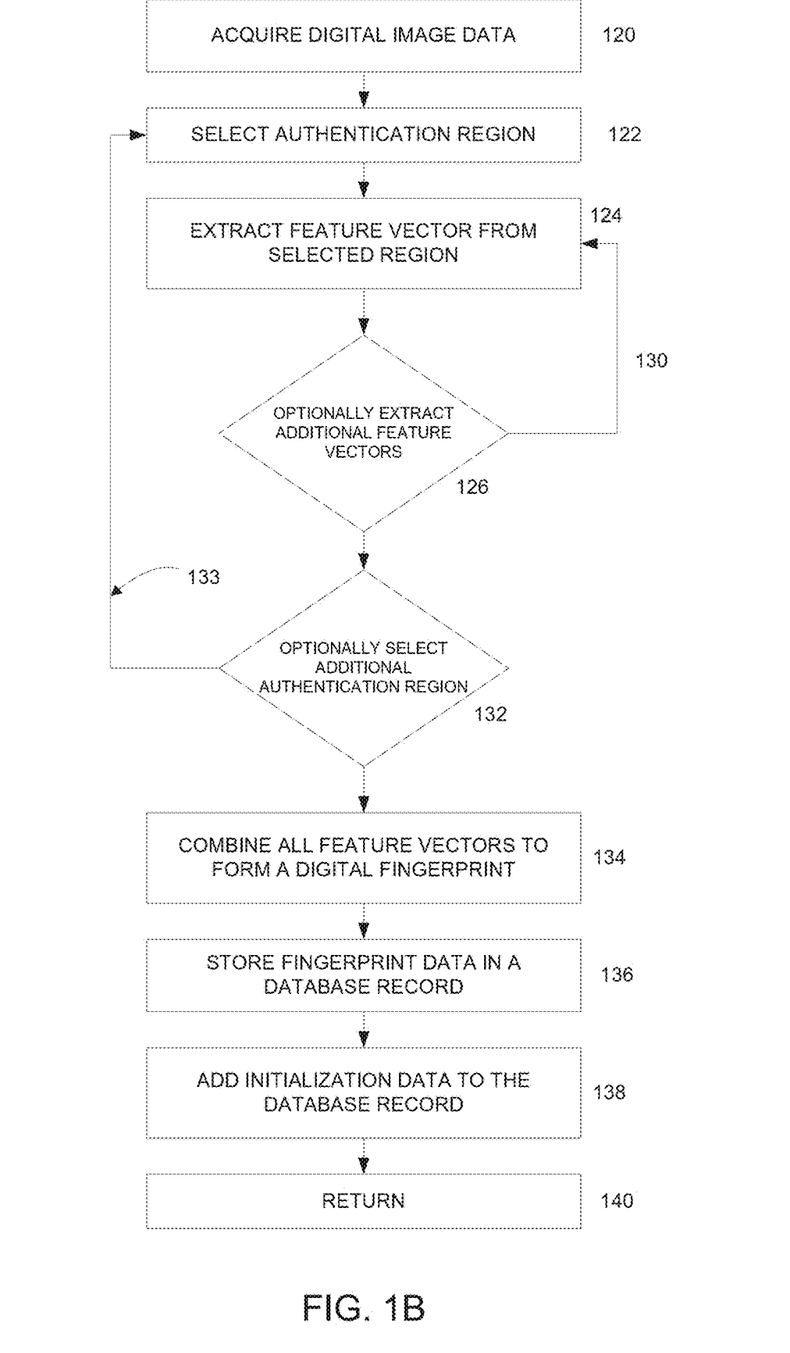
FIG. 1B illustrates a process that includes more robust feature extraction.

FIG. 1B illustrates a process that includes more robust feature extraction. In this example, we again begin with acquiring digital image data, block 120. We select at least one authentication region, block 122. This may be done by analysis of the image data, analysis of related image data, by reference to a predetermined template that defines at least one authentication region, or other means. The next block 124 calls for extracting a feature vector from the selected authentication region. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. In decision 126, there may be additional feature vectors to be extracted from the same image data. In that case, the flow returns, path 130, to repeat the feature extraction step 124. This loop 130 may repeat until all desired feature vectors are collected. Optionally, there may be another authentication region to process in the same image data, see decision 132. In that case, the outer loop 133 is traversed back to block 122 for further feature extraction with respect to one or more additional authentication regions. Then some or all of the extracted feature vectors may be combined to form a digital fingerprint, block 134, which is then stored, block 136, along with related data, block 138, as mentioned above. The process returns or concludes at block 140.

A database of digital fingerprints can form the basis of a system to track and trace the object through a supply chain, distribution network, or sales channel. A track and trace system based on digital fingerprinting has unique advantages and provides unique capabilities that are not available with track and trace systems based on traditional methods.

Holograms, bar codes and serial numbers can all be duplicated with varying degrees of effort. This means that if the code or tag can be duplicated, then counterfeit objects or two objects with the same identifier can exist in the supply chain or distribution network. They can then be registered in a traditional track and trace system. All such systems rely on determining that the anti-counterfeit item (label, hologram, RFID tag) is legitimate, not that the item itself is.

Due to this weakness, track and trace systems based on traditional approaches like bar codes or serial numbers cannot prevent the resulting corruption of the system database. A counterfeit object may be mistakenly identified as genuine, and generate a false audit trail as it is tracked through the supply chain. Two or more objects with the same ID (one genuine, one or more counterfeit) may exist at the same time. Without physically examining the objects it is impossible to tell which item is genuine. Once identification is made as to which object is genuine, the false trails must be removed from the database to restore integrity. This can be extremely difficult depending on the structure of the database and the complexity of the tracking data. In some cases the objects may not have any further contact with the track and trace system (for instance if they are purchased by a consumer), and the record will never be identified as false, leaving the database permanently corrupted.

In one embodiment of the Digital Fingerprinting Track and Trace System, an item may be scanned and identified at initial manufacture. Alternatively, an item may be scanned and identified at any subsequent time or location for entry into a tracking system. This point of identification preferably is done when the item is either in the possession of its manufacturer or has been transferred by secure means to the current holder so that its legitimacy at the point of identification is adequately established.

Figure 2:
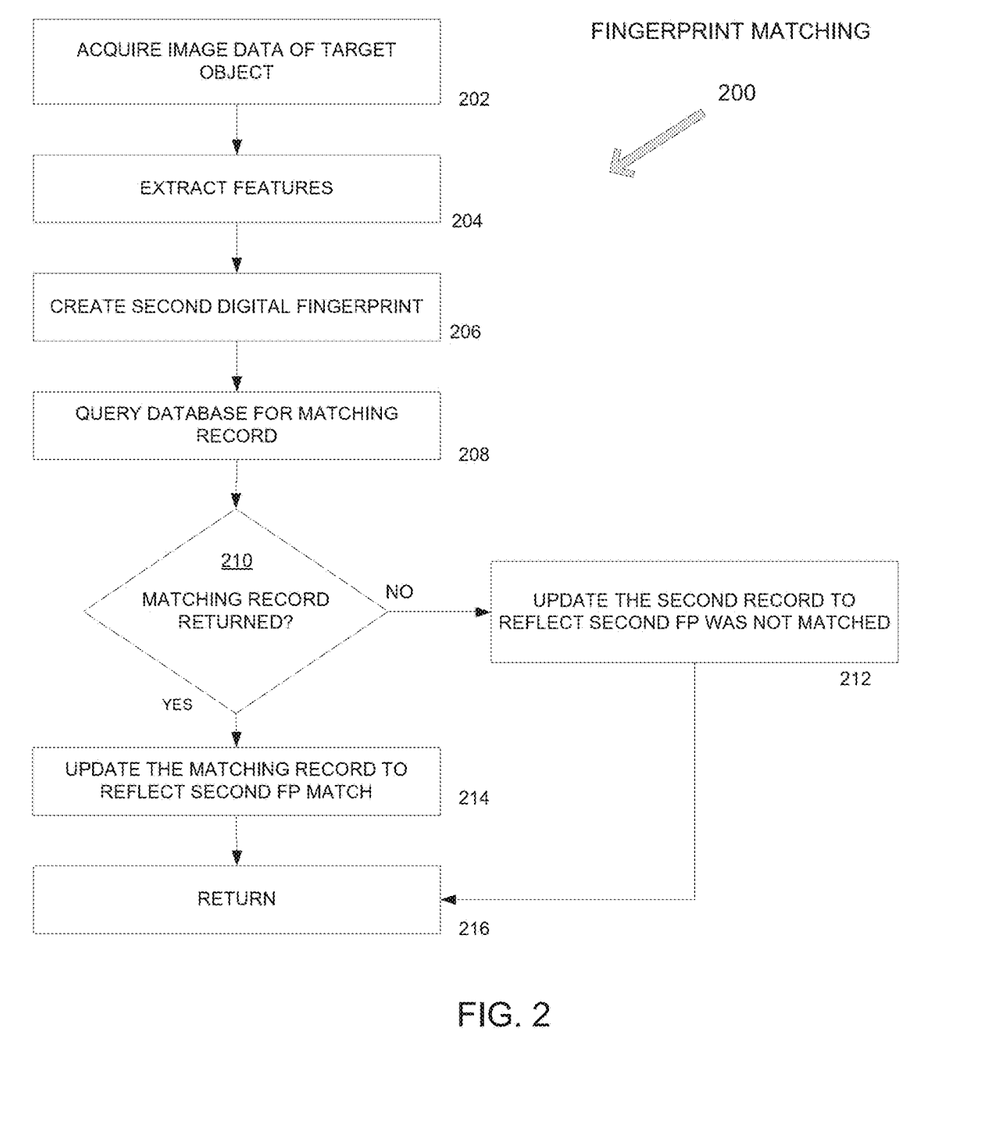
FIG. 2 is a simplified flow diagram illustrating a method for matching a digital fingerprint of a target object to a database of existing digital fingerprints.

The system then identifies the object every time it is scanned again, typically at discrete steps in manufacturing, distribution, and sale. FIG. 2 is a simplified flow diagram illustrating a method 200 for matching a digital fingerprint of a target object to a database of existing digital fingerprints. Here, we acquire image data of a "target object" i.e., the object we want to identify or authenticate by finding a match in the database, see block 202. We extract features from the target object image data, block 204, as discussed above. Then we create a new (second) digital fingerprint based on the extracted features, block 206. The next step is querying the database, block 208, for a record that matches the second digital fingerprint record. "Matching" in this context may be relative to a threshold confidence level rather than a binary decision. The requisite confidence level may vary depending on the specific application. The confidence level required may be varied dynamically responsive to the data and experience with a given system. If no "matching" record is returned, decision 210, update the second record (the digital fingerprint of the target object), block 212, to reflect that no match was found. If a match is returned, the matching record is updated to reflect the match, for example, it may be linked to the second record. The results may be returned to the user.

Figure 3:
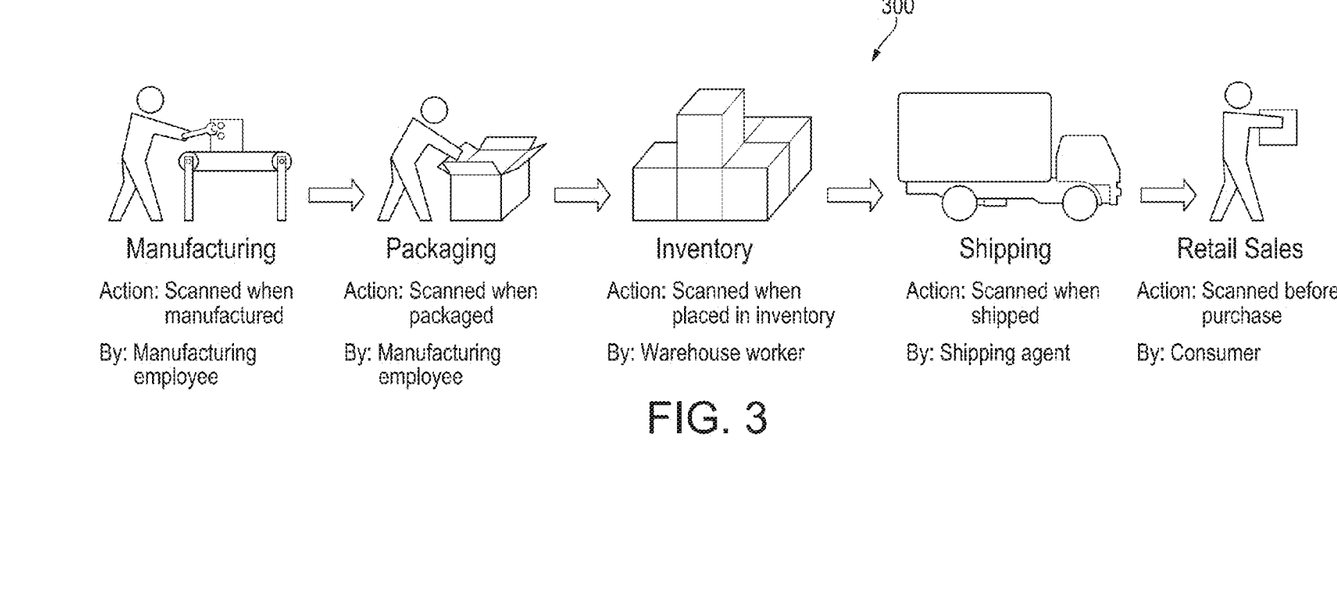
FIG. 3 is a simplified conceptual diagram showing scanning of an object at various times and places along a manufacture and distribution chain.

Typical tracking steps might include scanning at the point of manufacture, when packaged, when placed in inventory, when shipped, and at a retail point of purchase (upon arrival and again when sold), as illustrated in the tracking process 300 of FIG. 3. Each scan can be used to update a remote database.

As mentioned earlier, a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. It is critical to capture at least one native feature of the object, as distinguished from a feature added to the object for identification, such as a label, bar code, RFID tag, serial number, etc.

A "native feature" in this description is not concerned with reading or recognizing meaningful content. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but there is no effort to actually "read" or recognize the printed serial number (which may be bogus). Similarly, an RFID tag applied to an object may give rise to a fingerprint vector responsive to its appearance and location on the object. However, no effort is made to actually stimulate or "read" data or signals from the tag.

While the most common application of track and trace systems is in manufactured goods, the present system and methods, in various different embodiments, may be applied to any object that can be identified with a digital fingerprint and tracked. These include but are not limited to mail pieces, parcels, art, coins, currency, precious metals, gems, jewelry, apparel, mechanical parts, consumer goods, integrated circuits, firearms, pharmaceuticals and food and beverages. Tracking may consist of any sequence of actions where the object is scanned, such as each time an object is appraised, authenticated, certified, auctioned, displayed, or loaned. The system may store both positive and negative authentication transactions. In an embodiment, the system may store location information (associated with a scan or fingerprint), which provides a profile of where counterfeit goods may be encountered.

Figure 4:
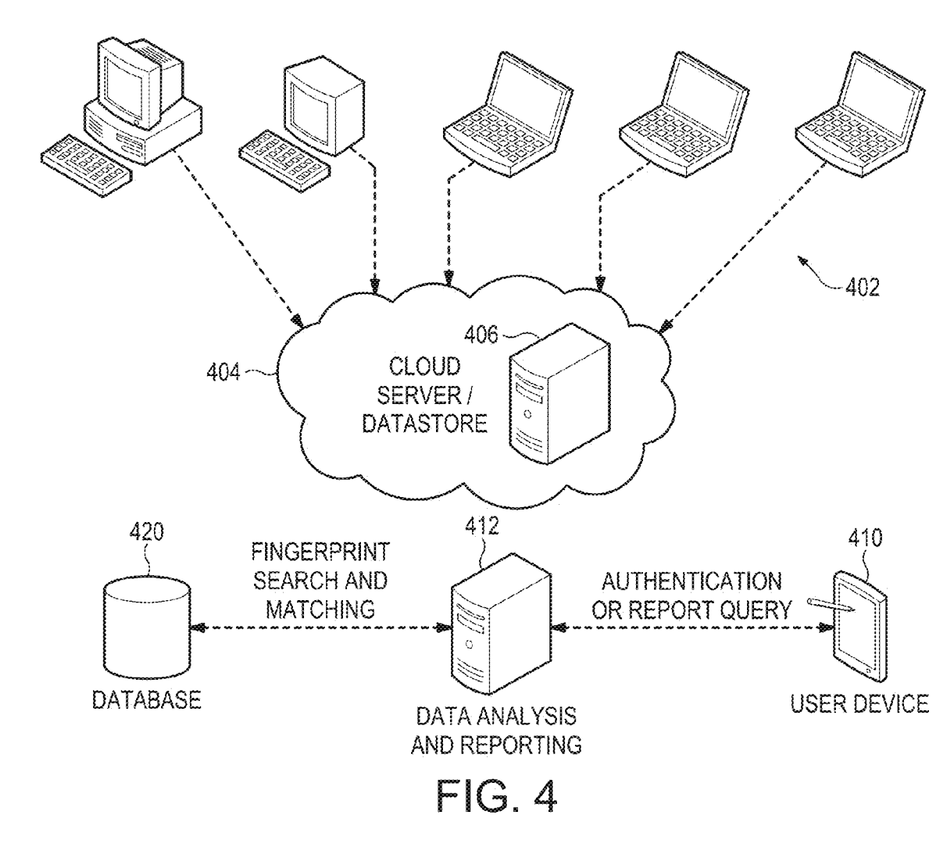
FIG. 4 is a simplified conceptual diagram illustrating use of a mobile device application to query authentication information related to an object.

FIG. 4 is a simplified conceptual diagram illustrating use of a mobile device application to query authentication information related to an object. Here, various computing devices or terminals 402 may have access over a network, for example, the Internet 404, to cloud computing facilities/services such as a cloud server/datastore 406. For example, the devices 402 may be located at various points along a distribution chain as illustrated in FIG. 3, each location scanning an object and updating the cloud server/datastore 406.

A server 412 may be provisioned to provide tracking and/or tracing data analysis and reporting. The server 412 has access to a datastore 420 which may be used to store digital fingerprints and related data. The server can query or search the database 420 for digital fingerprint search and matching. The database 420 preferably is coupled to the cloud server 406 in some embodiments. A mobile user device 410 such as a smartphone, tablet, laptop computer or dedicated device may be configured for communications with the server 412 to request and receive a reply or authentication report for an object of interest. This architecture is simplified and in any event is merely illustrative and not intended to be limiting.

Continuous and Discrete Tracking

In some implementations, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system, and continue to flow as the object changes location. Continuous (frequent) data updates can also be buffered in local memory in a sensor attached to the item, and then downloaded the next time the object is scanned and authenticated. This provides a record of where the object has traveled (it's itinerary).

As an example of the potential uses of sensor data, many products like food and beverages can degrade with exposure to certain environmental factors over the course of their storage and shipment. Examples of sensor data could include temperature, light exposure, altitude, oxygen level, or other factors, as well as location such as GPS data.

Figure 5:
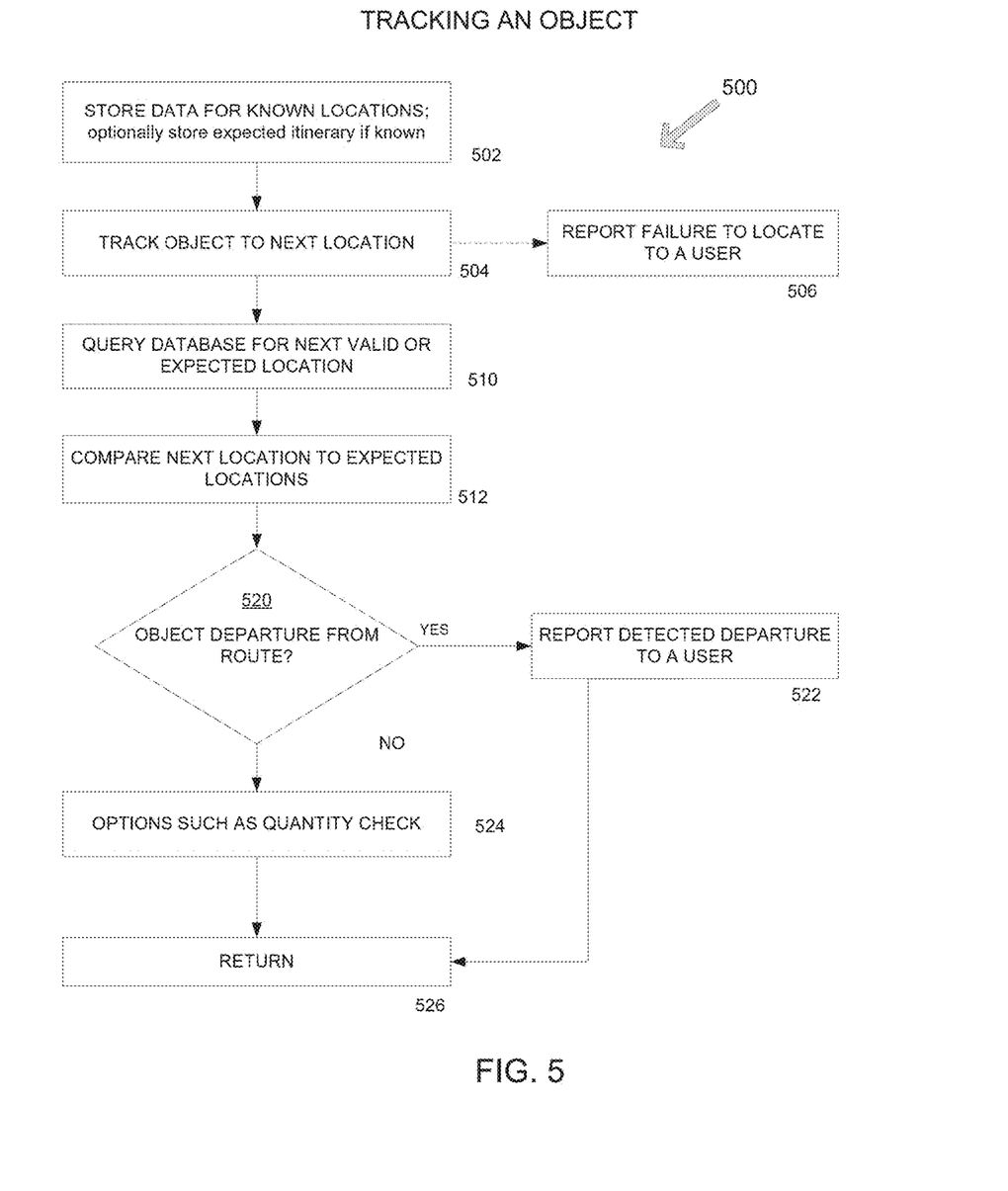
FIG. 5 is a simplified flow diagram illustrating a method for tracking an object to verify its provenance.

FIG. 5 is a simplified flow diagram illustrating one embodiment of a process 500 for tracking an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user. In an embodiment, an object that arrives later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing track and trace systems are only designed to be accessed by manufacturers or their authorized distributors, and often require specialized scanners or equipment. However, the consumer also has a vested interest in determining whether the items that they are buying are authentic. In some embodiments, the present system is designed to enable anyone along the supply, distribution, or sales chain, from manufacturer to the retail consumer, to access the system and determine whether the item is authentic. A specialized scanner is not required in all cases. For example, in one embodiment a mobile phone application designed for the consumer can be used to scan an object, query the database, and determine if the object is authentic.

Finally, data collected by a digital fingerprinting system offers a variety of useful information to people along the supply, distribution and sales chain. Reports can be generated on individual items, or on sets of items. These reports can include but are not limited to the locations of items over time, audit trails, points of entry of counterfeit goods, and exposure to environmental variables over the course of a object's lifetime.

Tags and Bar Codes

A tag may be added to an item, a barcode to a mail piece, etc. for two reasons. First, the human may need it to know what the item is. This is the identification function. It may identify the item to a store clerk as a particular style and size of clothing of a particular manufacturer, it may tell a postal carrier where to deliver a mail piece. Second, however, are tags that are only useful for a machine. Thus a four-state bar code on a mail piece (unreadable by humans) is used to route the mail piece by machine. This entire class of machine readable tags can be replaced by the methods of this patent. The first set may still be needed for human use but are now divorced from their authentication function.

Because we are exploiting natural features and often scanning the object under variable conditions, it is highly unlikely that two different "reads" will produce the exact same fingerprint. We therefore have to introduce the ability to look up items in the database when there is a near-miss. For example, two feature vectors [0, 1, 5, 5, 6, 8] and [0, 1, 6, 5, 6, 8] are not identical but (given the proper difference metric) may be close enough to say with certainty that they are from the same item that has been seen before. This is particularly true if, otherwise, the nearest feature vector of a different item is [5, 2, 5, 8, 6, 4]. For example, a distance between vectors of n-dimensions is easily calculated, and may be used as one metric of similarity or "closeness of match" between the vectors. One may also consider the distance to the next nearest candidate.

Obviating the Chain of Custody

Many systems rely on a known "chain of custody" to verify authenticity of an object. The rules of evidence in court, for example, typically require proof of a chain of custody to demonstrate authenticity of a hair sample, weapon or other piece of physical evidence. From the time an object is collected at a crime scene, for example, it is typically bagged, tagged, and moved into a locked box or evidence room for safekeeping. Each person who removes it must attest to returning the original item unchanged. Custody of the object from the crime scene to the evidence locker to the courtroom must be accounted for as an unbroken chain. Digital fingerprinting techniques as disclosed herein can be used to obviate most of that process. Provided an original object is under the control and custody of an authorized or trusted entity at least once, and a digital fingerprint, or an image suitable for forming a digital fingerprint of the object, is acquired under such circumstances, and stored, the object is uniquely identifiable thereafter by that fingerprint for the lifetime of the object.

Because digital fingerprinting works by extracting key features of an object, it may be used to identify or authenticate objects even after a good deal of wear and tear. At any subsequent time, a suspect or "target" object can be similarly "fingerprinted" and the subsequent fingerprint compared to the stored fingerprint of the original object. If they match, authenticity is established, regardless of where or in whose custody the object may have traveled in the meantime. Returning to the crime scene example, if a digital fingerprint is acquired of a weapon taken from the crime scene, and the digital fingerprint stored, the weapon can be fingerprinted again at any subsequent time, and the digital fingerprints compared to authenticate to weapon. Custody of the weapon in the interim is no longer an issue. Likewise when a coin or piece of art is stolen our technology gives us the ability to continue the original provenance even though chain of custody has been lost (i.e. we know it is the same coin we saw before even though it has not been in our direct possession during the time between theft and recovery).

Global vs. Regional Feature Matching

In a case where we have the original document or other object fingerprinted, our techniques allow region-by-region matching so that we can tell what (if any) regions have been changed. Thus, for example, we might get a really good overall match on a passport but none of the matches happen in the photograph—so we know the photograph probably was changed. Further, if some individual or group, say Al Qaeda, has a certain pattern or regularity to altering passports—change the photo, the date of birth and one digit of the passport number, say—then this ability to find altered regions also gives us the ability to discern the pattern of changes and thus develop a signature of the group making the changes. Thus aspects of the present technology can be applied not only to detect a forged or altered document, but to identify in some cases the source of the bogus document.

It will be obvious to those having skill in the art that many changes may be made to the details of the above-described embodiments without departing from the underlying principles of the invention. The scope of the present invention should, therefore, be determined only by the following claims.

The invention claimed is:

1. A method for tracking a physical object comprising the steps of:
   acquiring digital image data of an image of at least a portion of a physical object;
   identifying a class of objects to which the physical object belongs;
   accessing a stored feature template associated with the identified class of objects, wherein the feature template defines a first authentication region and defines at least one feature located within the first authentication region;
   analyzing the image data to form a digital fingerprint of the object, wherein the digital fingerprint is responsive to natural structure of the object at least in that, first, it does not rely upon or require any labels, tags, integrated materials, unique identification characters, codes or other items that were added to the object specifically for the purpose of identification, and second, the digital fingerprint does not include text or symbols recognized from the image data;
   and wherein analyzing the image data includes—
   selecting a subset of the image data corresponding to the authentication region defined by the feature template;
   locating the at least one feature located within the first authentication region;
   for each feature, extracting at least one feature vector, the feature vector comprising an array of numeric values based on a portion of the image data corresponding to the feature;
   combining the extracted feature vectors to form the digital fingerprint, without including in the fingerprint any text or symbols recognized from the image data and storing the digital fingerprint in a database record.

2. The method of claim 1 and further comprising adding initialization data about the object to the database record, so that the initialization data is associated with the digital fingerprint without changing the digital fingerprint itself.

3. The method of claim 1 and further comprising:
   subsequent to storing the digital fingerprint in a database record, acquiring second digital image data of an image of at least a portion of a target physical object;
   extracting at least one feature vector from the second image data to form a second digital fingerprint in accordance with the stored feature template;

querying the database to seek a matching record based on the second digital fingerprint;

wherein querying the database includes calculating a Euclidean vector distance between corresponding feature vectors of the second digital fingerprint and digital fingerprints previously stored in the database;

returning a matching record based on the corresponding vector distances;

in the case that a matching record is returned; updating the matching record with an indication that the second digital fingerprint was matched to it; and in the case that a matching record is not returned; updating the matching record with an indication that the second digital fingerprint was not matched to it.

4. The method of claim 3 wherein matching a record comprises fuzzy matching.

5. The method of claim 3 wherein matching a record comprises identifying at least one record having a digital fingerprint that matches the second digital fingerprint within a predetermined threshold of similarity.

6. The method of claim 3 and further comprising adding second data to the database in association with the database record, wherein the second data is associated with the target physical object but the second data is not itself a digital fingerprint.

7. The method of claim 3 including, based on identifying a matching record, updating the matching record with at least one of an indication of a current location of the target physical object and an identification of an entity having possession of the target physical object.

8. The method of claim 3 and further comprising storing the second digital fingerprint in the database and associating the second digital fingerprint with the database record.

9. The method of claim 3 wherein the object comprises Government documents, legal and financial documents, mail pieces, parcels, art, photographs, coins, currency, precious metals, gems, jewelry, apparel, mechanical parts, consumer goods, integrated circuits, weapons, pharmaceuticals, drugs, alcohol, tobacco and food and beverages.

10. A method comprising:
identifying a class of objects to which a physical object belongs;
accessing a stored feature template associated with the identified class of objects, wherein the feature template defines plural authentication regions;
acquiring digital image data of an image of at least a portion of a physical object that includes the plural authentication regions;
for each of the plural authentication regions, extracting at least one feature vector, the feature vector comprising an array of numeric values based on a correspond portion of the image data;
combining the extracted feature vectors to form a digital fingerprint, without including in the fingerprint any text or symbols recognized from the image data;
storing the digital fingerprint in a database;
acquiring a second digital fingerprint of a target object that belongs to the identified class of objects;
querying the database based on the second digital fingerprint to find a matching fingerprint, wherein a matching record requires that the second digital fingerprint match the stored extracted feature vectors for each and every one of the plural authentication regions defined by the stored feature template within a predetermined tolerance.

11. The method of claim 10 wherein extracting the feature vector from the authentication region includes identifying a location and shape of a distinctive aspect with the selected region based on the image data.

12. A method for authenticating an object comprising:
identifying a class of objects;
accessing a stored feature template associated with the identified class of objects, wherein the feature template defines a first authentication region, a second authentication region, and a position of the second authentication region relative to the first authentication region;
acquiring digital image data of an image of at least a portion of an object that includes the first and second authentication regions;
selecting a first subset of the image data corresponding to the first authentication region;
extracting at least a first feature vector from the first subset to form a first digital fingerprint associated with the first authentication region, the first feature vector comprising an array of numeric values based on the first subset of the image data;
selecting a second subset of the image data corresponding to the second authentication region;
extracting at least a second feature vector from the second subset to form a second digital fingerprint associated with the second authentication region, the second feature vector comprising an array of numeric values based on the first subset of the image data;
determining a position of the second authentication region relative to the first authentication region in the image data and querying a database of stored digital fingerprints to find a record in which—
(1) the stored digital fingerprint includes a first stored digital fingerprint that matches the first digital fingerprint associated with the first authentication region within a predetermined threshold difference tolerance;
(2) the stored digital fingerprint includes a second stored digital fingerprint that matches the second digital fingerprint associated with the second authentication region within a predetermined threshold difference tolerance; and
(3) the defined position of the second authentication region relative to the first authentication region matches the determined position of the second authentication region relative to the first authentication region in the image data within a predetermined threshold difference tolerance; and
responsive to finding a record in the database in which at least said three criteria are met, reporting an indication that the object matches an object that corresponds to the database record.

13. The method of claim 12 wherein the extracted first feature vector represents the image data corresponding to the first authentication region in a compacted form.

14. The method of claim 12 wherein the first extracted feature vector comprises an array of color or gray scale numeric values corresponding to areas within the first authentication region.

15. The method of claim 12 wherein the first extracted feature vector comprises at least one numeric value that represents a selected mathematical function of the individual values of a corresponding group of pixels forming a sub-part of the first authentication region.

16. The method of claim 12 including associating the matching database record to the acquired digital image data.

* * * * *